United States Patent
Roodman et al.

(10) Patent No.: US 7,300,586 B2
(45) Date of Patent: *Nov. 27, 2007

(54) PH STABLE ACTIVATED CARBON

(75) Inventors: Robert G. Roodman, Ellwood City, PA (US); Jack Smiley, Monaca, PA (US); J. Michael Havelka, Follansbee, WV (US); Robert Scherrer, Pittsburgh, PA (US)

(73) Assignee: Envirotrol, Inc., Darlington, PA (US)

( * ) Notice: Subject to any disclaimer, the term of this patent is extended or adjusted under 35 U.S.C. 154(b) by 45 days.

This patent is subject to a terminal disclaimer.

(21) Appl. No.: 11/197,109

(22) Filed: Aug. 4, 2005

(65) Prior Publication Data

US 2005/0269270 A1    Dec. 8, 2005

Related U.S. Application Data

(63) Continuation of application No. 09/777,603, filed on Feb. 6, 2001, now Pat. No. 6,946,077.

(60) Provisional application No. 60/250,345, filed on Nov. 30, 2000.

(51) Int. Cl.
*C02F 1/28* (2006.01)
*C01B 31/08* (2006.01)

(52) U.S. Cl. ............... 210/679; 210/694; 210/743; 210/502.1; 502/416; 502/417; 502/418; 502/426; 502/437

(58) Field of Classification Search ............ 210/679, 210/694, 743, 502.1; 502/416–418, 426, 502/437
See application file for complete search history.

(56) References Cited

U.S. PATENT DOCUMENTS

| 4,111,842 | A | 9/1978 | van Montfoort et al. ... 502/183 |
|---|---|---|---|
| 4,154,704 | A | 5/1979 | Vinton et al. ............... 502/433 |
| 4,204,041 | A | 5/1980 | Bailey et al. ............... 435/177 |
| 4,789,475 | A | 12/1988 | Harte et al. .............. 210/502.1 |
| 5,021,164 | A | 6/1991 | Gay ........................... 210/694 |
| 5,348,755 | A | 9/1994 | Roy .......................... 426/541 |
| 5,368,738 | A | 11/1994 | Dussert et al. ............. 210/660 |
| 5,368,739 | A | 11/1994 | Dussert et al. ............. 210/660 |
| 5,437,797 | A | 8/1995 | Helmig ...................... 210/669 |
| 5,437,845 | A | 8/1995 | Brioni et al. ............... 422/198 |
| 5,466,378 | A | 11/1995 | Dussert et al. ............. 210/660 |
| 5,626,820 | A | 5/1997 | Kinkead et al. ............. 422/122 |
| 5,714,433 | A | 2/1998 | Farmer et al. ............. 502/430 |
| 5,876,607 | A | 3/1999 | Farmer et al. ............. 210/681 |
| 6,114,162 | A | 9/2000 | Kashiba ................... 435/252.1 |
| 6,436,294 | B2 | 8/2002 | Lundquist ................... 210/674 |
| 6,946,077 | B2 * | 9/2005 | Roodman et al. ........... 210/679 |

* cited by examiner

*Primary Examiner*—Chester T. Barry

(57) ABSTRACT

An activated carbon composition is disclosed, which includes an activated carbon and a carboxylic acid containing compound. The activated carbon composition is prepared by immersing an activated carbon in an aqueous solution of a carboxylic acid containing compound. The activated carbon composition is used for purifying aqueous solutions by providing a bed of the activated carbon composition and passing the aqueous solution through the bed of the activated carbon composition. The aqueous solution is passed through the bed such that the flow of the aqueous solution to be purified into the bed and the flow of purified aqueous solution from the bed has a pH differential less than ±1 pH.

20 Claims, No Drawings

PH STABLE ACTIVATED CARBON

CROSS-REFERENCE TO RELATED APPLICATION

This application is a continuation of U.S. patent application Ser. No. 09/777,603 filed Feb. 6, 2001, now U.S. Pat. No. 6,946,077, which claims priority from U.S. Provisional Patent Application Ser. No. 60/250,345, filed Nov. 30, 2000, entitled "pH Stable Activated Carbon", which are incorporated herein.

BACKGROUND OF THE INVENTION

1. Field of the Invention

This invention relates to activated carbon used to treat aqueous systems. More specifically, this invention relates to activated carbon that has been modified to control pH and alkalinity excursions during the start-up phase of activated carbon aqueous adsorption systems.

2. Description of the Prior Art

Activated carbon has been a technically and economically successful material for treating aqueous systems. However, when starting up activated carbon aqueous treatment systems, it is typical to experience unacceptable increases in the pH and/or alkalinity of the effluent. These unacceptable levels of pH or alkalinity can last from several hours to several days. When these excursions occur, the treated water does not meet the standards for distribution to the customer or discharge to the environment. This problem can lead to a significant loss in production, environmental problems, or expensive remedial actions.

The pH/alkalinity excursion phenomenon has been found to occur for various types of water treatment applications such as municipal water, industrial process water, ground water, and home water filter applications. It has been found to exist using various types of activated carbons such as those produced from bituminous coal, subbituminous coal, wood, coconut or peat feedstocks.

The presence of these pH/alkalinity excursions has been a recurring problem throughout the industry for many years. Notwithstanding the productivity losses associated with these excursions, little has been done to overcome or alleviate the problem. pH/alkalinity excursions have been largely tolerated because no solution was known to exist outside of processes detailed in a select group of patents. Because of the growing concern for the environmental problems associated with these excursions as well as the economic losses, it would be desirable to provide another method for preventing or eliminating them.

An example of activated carbon used to treat aqueous systems is disclosed in U.S. Pat. No. 5,021,164 to Gay. Gay discloses oxidized activated carbon, which is used to remove aromatic compounds from aqueous solutions. The oxidized activated carbon is produced by contacting activated carbon with an acidic oxidizing agent such as permanganate, nitric acid and hydrogen peroxide.

Activated carbon, when first put "on-line" in water service, acts as an ion exchange medium on its surface and causes the pH of the outlet water to rise for up to several hundred or thousands of bed volumes. The problem is currently being addressed by methods such as those disclosed in U.S. Pat. No. 5,714,433 to Farmer et al. Farmer discloses a wet activated carbon that has been treated with carbon dioxide, which is optionally followed by treatment by air. The treated wet activated carbon modifies the initial contact pH of the aqueous system such that it is less than about 9.

U.S. Pat. Nos. 5,368,738 and 5,466,378 to Dussert et al. disclose an oxidized activated carbon having a contact pH between 7.1 and 8.2 for use in aqueous treatment systems. The oxidized activated carbon minimizes pH and alkalinity excursions during start-up of the system.

SUMMARY OF THE INVENTION

The present invention is directed to an activated carbon composition, which includes an activated carbon and a carboxylic acid containing compound. The activated carbon composition is prepared by immersing an activated carbon in an aqueous solution of a carboxylic acid containing compound.

The activated carbon composition of the present invention is used to purify aqueous solutions by contacting an aqueous solution with the activated carbon composition of the present invention. The method for purifying an aqueous solution is carried out by providing a bed of an activated carbon composition of the present invention and passing the aqueous solution through the bed of the activated carbon composition. The aqueous solution is passed through the bed such that there is a flow of an aqueous solution to be purified into the bed and a flow of purified aqueous solution from the bed. The pH of the aqueous solution to be purified differs less than ±1 pH unit from the pH of the purified aqueous solution.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about".

The present invention is directed to producing a pH stable activated carbon composition, i.e., an outflow pH deviation of less than 1 pH unit compared to the input water, by means of an activated carbon impregnated with a carboxylic acid containing compound that is suitable for food grade or potable water use as well as for industrial and waste water applications. The lasting effect of the acid renders it suitable for preventing pH rise while the surface chemistry of the activated carbon in the bed comes to a natural equilibrium and no longer acts as an ion exchange medium. The acid does not oxidize the carbon surface, but instead occupies some of the higher energy adsorption sites, preventing ion exchange.

The activated carbon composition of the present invention is useful for removing impurities from aqueous systems. A specific benefit of the activated carbon composition of the present invention is that the problem of pH excursions during the start-up phase of the treatment is ameliorated.

The activated carbon composition of the present invention includes activated carbon, a carboxylic acid containing compound and water. The carboxylic acid containing compound and water are generally adsorbed onto the surface of the activated carbon and any excess liquid is drained off. The carboxylic acid containing compound content adsorbed on the surface of the activated carbon is generally 0.01 to 5, preferably 0.1 to 5, more preferably 0.1 to 3, and most preferably 0.5 to 2.0 percent by weight based on the dry weight of activated carbon. The amount of water present is generally 20 to 60, preferably 30 to 50, and more preferably 40 to 50 percent by weight based on the dry weight of activated carbon. The balance of the composition is the activated carbon.

The present invention is further directed to a method of preparing the activated carbon composition described above. The method includes immersing activated carbon in an aqueous solution of a carboxylic acid containing compound. The concentration of the carboxylic acid containing compound in the aqueous solution will be an amount sufficient to allow a preferred amount of the carboxylic acid containing compound to be adsorbed onto the surface of the activated carbon. This concentration will vary depending on the specific carboxylic acid containing compound, or combination of carboxylic acid containing compounds employed and may be from 0.01 to 10, preferably 0.1 to 5, more preferably 0.1 to 2 and most preferably 0.5 to 1.5 percent by weight.

The immersed activated carbon is soaked in the aqueous solution of a carboxylic acid containing compound for a period of time sufficient to allow a preferred amount of the carboxylic acid containing compound to be adsorbed onto the surface of the activated carbon. The period of time will vary depending on the specific carboxylic acid containing compound, or combination of carboxylic acid containing compounds employed and may be from 0.5 to 48, preferably 2 to 36, more preferably from 4 to 24, and most preferably from 8 to 12 hours.

The resulting activated carbon composition may be used in any acceptable form, such as wet activated carbon as it is received from the method described above. The activated carbon composition can be dried, or it may be utilized as a slurry in water.

The activated carbon of the present invention can be in a dry form. The dry activated carbon composition of the present invention is prepared by drying the wet activated carbon that has been immersed in the aqueous solution of a carboxylic acid containing compound. The drying step is accomplished by exposing the wet activated carbon to a temperature of from 50 to 250, preferably from 75 to 225, and most preferably from 100 to 200° C. for from 30 minutes to 12 hours, preferably from 1 to 8 hours and most preferably from 1 to 6 hours. The length of time required for drying the activated carbon composition of the present invention is determined based on the temperature employed, water content of the wet activated carbon composition, and/or the specific carboxylic acid containing compound. The drying step is performed such that no observable oxidation of the activated carbon composition occurs.

The dry activated carbon composition of the present invention will typically contain less than 20, preferably less than 15 and most preferably less than 10 percent by weight of water. The carboxylic acid containing compound content adsorbed on the surface of the activated carbon is generally 0.01 to 5, preferably 0.1 to 5, more preferably 0.1 to 3, and most preferably 0.5 to 2.0 percent by weight based on the weight of the dry activated carbon. The amount of water present is generally 0 to 20, preferably 0.1 to 15, and more preferably 0.5 to 10, and most preferably 1 to 10 percent by weight based on the weight of the dry activated carbon. The balance will be the activated carbon and may be described as being from 75 to 99.99, preferably 80 to 99.8, more preferably 87 to 99.4 and most preferably 88 to 98.5 percent by weight based on the weight of the dry activated carbon composition.

Any commercially available activated carbon may be used in preparing the activated carbon composition of the present invention. The activated carbon used in the present invention can be derived from any suitable carbon source known in the art. The activated carbon is formed by placing the carbon source in a high temperature environment and exposing the carbon source to an activating gas or other activating chemical agent, increasing the porosity of the resulting activated carbon. Carbon sources include coal, such as bituminous, anthracite and lignite; wood; peat; coconut shells; and synthetic polymers. Preferred carbon sources are coal and coconut shells. The activated carbon can be in granular or powder form. It is preferred that the activated carbon be in a granular activated carbon (GAC) form; GAC includes activated carbon in pellet form. The carbon can be either virgin activated carbon or re-activated carbon, whether such re-activation is done thermally or by chemical agents. The carbon can be acid washed or not.

The carboxylic acid containing compound can be any carboxylic acid containing compound, or its corresponding salts, that will effectively prevent pH excursions during the start-up phase of an aqueous treatment system using the activated carbon composition of the present invention. Preferred carboxylic acid containing compounds can be described by general formula I:

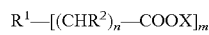

$$R^1-[(CHR^2)_n-COOX]_m \qquad \text{I}$$

Where $R^1$ can be any $C_1$-$C_{12}$ alkyl, alkenyl, alkynol, alkylamine or aryl; $R^2$ can be —H, —OH, or $C_1$-$C_6$ alkyl, alkenyl, alkynol, alkylamine or aryl; X is —H, $Li^+$, $Na^+$, $K^+$, $Mg^{+2}$, $Ca^{+2}$, $NH_4^+$, $Fe^{+2}$, $Fe^{+3}$, $Cu^+$ or $Cu^{+2}$; n is an integer from 0 to 12; and m is an integer from 1 to 20. For each occurrence of m, $R^2$, n and X can be the same or different.

Preferred carboxylic acid containing compounds also include low molecular weight polymers that contain monomer residues that include a carboxylic functional group. Such polymers and copolymers can be made by methods well known in the art of polymer synthesis. Specific examples of suitable carboxylic acid containing monomers include, but are not limited to, the following carboxylic acids as well as their corresponding anhydrides and salts: (meth)acrylic acid, maleic acid, itaconic acid, fumaric acid, alpha-halo acrylic acid, vinyl acetic acid, and beta-carboxymethyl (meth)acrylate. Preferred carboxylic containing monomers include (meth)acrylic acid, maleic acid and itaconic acid. The carboxylic acid containing polymers will generally have a molecular weight less than 1,000,000, preferably less than 100,000, more preferably less than 50,000 and most preferably less than 10,000 as measured by gel permeation chromatography.

More preferred carboxylic acid containing compounds include hydroxy carboxylic acids which include, but are not limited to, citric acid, ascorbic acid, erythorbic acid, glycolic acid, lactic acid, salicylic acid, hydroxybutyric acid, and/or hydroxyvaleric acid, as well as their corresponding ammonium, sodium, and potassium salts. More preferred carboxylic acid containing compounds are those useful as sequestering agents, buffers, base neutralizers, antioxidants or reducing agents. Examples of such hydroxy carboxylic acid containing compounds include, but are not limited to, citric acid, ascorbic acid and erythorbic acid. In a most preferred embodiment, citric acid is the carboxylic acid containing compound.

The present invention is also directed to a method for treating aqueous systems. Aqueous systems, which can be treated by the method of the present invention, include industrial and municipal effluents as well as potable water supplies.

In the present method, an aqueous solution is purified by contacting it with the activated carbon composition of the present invention. The activated carbon composition of the present invention adsorbs the impurities in the aqueous system. The method of the present invention is carried out by passing the aqueous effluent through a reaction zone in which the activated carbon composition of the present invention is retained during the contact period. The pH of the treated aqueous solution changes less than ±1 pH unit during the start-up phase, which involves exposure of over 2,500 bed volumes of the aqueous system to the activated carbon composition of the present invention.

EXAMPLE 1

25 g of 12×40 mesh granular, bituminous coal based, activated carbon with a contact pH of 9.14, was soaked in a solution of 100 g of water containing 1.5 g of citric acid. The excess solution was drained off of the carbon. The carbon was placed into a 42.66 ml bed and exposed to a flow of well water having a pH of 7.45. The flow was such that 237.45 bed volumes passed through the bed every hour, a total of 2,848 bed volumes. The effluent pH was monitored over time and is summarized in Table 1.

TABLE 1

| Time (min.) | Effluent pH | PH Change | Time (min.) | Effluent PH | PH Change |
|---|---|---|---|---|---|
| 0 | 7.00 | −0.45 | 390 | 8.09 | 0.64 |
| 30 | 7.30 | −0.15 | 420 | 8.10 | 0.65 |
| 60 | 7.32 | −0.13 | 450 | 8.14 | 0.69 |
| 90 | 7.47 | 0.02 | 510 | 8.18 | 0.73 |
| 120 | 7.69 | 0.24 | 540 | 8.15 | 0.70 |
| 150 | 7.71 | 0.26 | 570 | 8.17 | 0.72 |
| 180 | 7.73 | 0.28 | 600 | 8.17 | 0.72 |
| 210 | 7.76 | 0.31 | 600 | 8.14 | 0.69 |
| 240 | 7.83 | 0.38 | 630 | 8.12 | 0.67 |
| 270 | 7.88 | 0.43 | 660 | 8.01 | 0.56 |
| 300 | 7.98 | 0.53 | 690 | 8.04 | 0.59 |
| 330 | 8.04 | 0.59 | 720 | 8.08 | 0.63 |
| 360 | 8.07 | 0.62 | | | |

The data demonstrate the ability of the activated carbon composition of the present invention to maintain an outflow pH of ±1 pH units during and after the start-up phase of treating an aqueous system with an activated carbon bed containing the present activated carbon composition.

60 g of 12×40 mesh granular, bituminous coal based, activated carbon with a contact pH of 9.17, was soaked in a solution of 100 g of water containing 1.5 g of citric acid. The excess solution was drained off of the carbon. The solution pH was measured at 3.64. The carbon was placed into a 120 ml bed and exposed to a flow of well water having a pH of 7.20. The flow rate was 780 ml/min, such that 390 bed volumes passed through the bed every hour. The effluent pH was monitored over time and is summarized in Table 2.

TABLE 2

| Time (min.) | Effluent pH | PH Change | Time (min.) | Effluent PH | PH Change |
|---|---|---|---|---|---|
| 0 | 6.23 | −0.97 | 36 | 7.15 | −0.05 |
| 1 | 6.36 | −0.84 | 37 | 7.16 | −0.04 |
| 2 | 6.43 | −0.77 | 38 | 7.17 | −0.03 |
| 3 | 6.49 | −0.71 | 39 | 7.17 | −0.03 |
| 4 | 6.53 | −0.67 | 40 | 7.18 | −0.02 |
| 5 | 6.58 | −0.62 | 41 | 7.19 | −0.01 |
| 6 | 6.58 | −0.62 | 42 | 7.20 | 0.00 |
| 7 | 6.68 | −0.52 | 43 | 7.21 | 0.01 |
| 8 | 6.69 | −0.51 | 44 | 7.21 | 0.01 |
| 9 | 6.70 | −0.50 | 45 | 7.21 | 0.01 |
| 10 | 6.70 | −0.50 | 46 | 7.22 | 0.02 |
| 11 | 6.71 | −0.49 | 47 | 7.23 | 0.03 |
| 12 | 6.73 | −0.47 | 48 | 7.25 | 0.05 |
| 13 | 6.75 | −0.45 | 49 | 7.25 | 0.05 |
| 14 | 6.77 | −0.43 | 50 | 7.26 | 0.06 |
| 15 | 6.78 | −0.42 | 51 | 7.27 | 0.07 |
| 16 | 6.79 | −0.41 | 52 | 7.29 | 0.09 |
| 17 | 6.81 | −0.39 | 53 | 7.29 | 0.09 |
| 18 | 6.84 | −0.36 | 54 | 7.30 | 0.10 |
| 19 | 6.88 | −0.32 | 55 | 7.31 | 0.11 |
| 20 | 6.92 | −0.28 | 56 | 7.32 | 0.12 |
| 21 | 6.96 | −0.24 | 57 | 7.33 | 0.13 |
| 22 | 6.98 | −0.22 | 58 | 7.33 | 0.13 |
| 23 | 7.00 | −0.20 | 59 | 7.34 | 0.14 |
| 24 | 7.02 | −0.18 | 60 | 7.34 | 0.14 |
| 25 | 7.04 | −0.16 | 75 | 7.33 | 0.13 |
| 26 | 7.06 | −0.14 | 90 | 7.39 | 0.19 |
| 27 | 7.07 | −0.13 | 105 | 7.39 | 0.19 |
| 28 | 7.08 | −0.12 | 120 | 7.44 | 0.24 |
| 29 | 7.09 | −0.11 | 135 | 7.42 | 0.22 |
| 30 | 7.09 | −0.11 | 150 | 7.42 | 0.22 |
| 31 | 7.10 | −0.10 | 165 | 7.41 | 0.21 |
| 32 | 7.11 | −0.09 | 180 | 7.41 | 0.21 |
| 33 | 7.13 | −0.07 | 195 | 7.40 | 0.20 |
| 34 | 7.14 | −0.06 | 210 | 7.40 | 0.20 |
| 35 | 7.15 | −0.05 | | | |

The data demonstrate the ability of the wet activated carbon composition of the present invention to maintain an outflow pH of ±1 pH units during and after the start-up phase of treating an aqueous system with an activated carbon bed containing the present activated carbon composition.

EXAMPLE 3

A dry activated carbon—citric acid composition was prepared by immersing an activated carbon, having a contact pH of 9.14, in a solution of 1 g of citric acid in 100 g of water. The excess solution was drained off of the carbon, and the activated carbon—citric acid composition was dried for 3 hours in a 150° C. oven.

EXAMPLES 4 AND 5

The contact pH value for the activated carbon—citric acid compositions of Examples 1 and 3 was measured as described in U.S. Pat. No. 5,368,738 to Dussert et al. The contact pH of a given activated carbon was determined by adding 25 g (on a dry basis) of GAC into an 80 mg $SO_4^-$/L sodium sulfate solution prepared in purified water. The solution was gently stirred. The solution pH was determined after a contact time of thirty (30) minutes with the following results:

TABLE 3

| Example No. | Contact pH |
|---|---|
| 1 | 4.20 |
| 2 | 4.27 |

The results demonstrate the similarity between the wet and dry examples of the activated carbon—citric acid compositions of the present invention. As compared to the oxidized activated carbon described in U.S. Pat. No. 5,368, 738, which claims a contact pH of less than 8.2, and a contact pH range of between about 7.1 and 8.2, no oxidation was observed on drying the activated carbon of Example 3.

EXAMPLE 6

60 grams of 12×40 mesh granular, bituminous coal based, activated carbon with a contact pH of 9.14, was soaked in a solution of 100 g of water containing 1 g of citric acid. The excess solution was drained off the carbon, and then the carbon was dried for 3 hours in a 150° C. oven. The carbon was placed into a 120 ml bed and exposed to a flow of well water having a pH of 7.08. The flow was such that that 390 bed volumes passed through the bed every hour, a total of 2437.5 bed volumes. The effluent pH was monitored over time and is summarized in Table 4.

TABLE 4

| Time, min. | Effluent pH | pH Change |
|---|---|---|
| 0 | 7.96 | 0.88 |
| 1 | 7.90 | 0.82 |
| 2 | 7.86 | 0.78 |
| 3 | 7.80 | 0.72 |
| 4 | 7.77 | 0.69 |
| 5 | 7.73 | 0.65 |
| 10 | 7.64 | 0.56 |
| 15 | 7.59 | 0.51 |
| 20 | 7.58 | 0.50 |
| 30 | 7.60 | 0.52 |
| 35 | 7.62 | 0.54 |
| 40 | 7.59 | 0.51 |
| 45 | 7.60 | 0.52 |
| 50 | 7.60 | 0.52 |
| 55 | 7.63 | 0.55 |
| 60 | 7.66 | 0.58 |
| 75 | 7.68 | 0.60 |
| 90 | 7.72 | 0.64 |
| 105 | 7.75 | 0.67 |
| 120 | 7.80 | 0.72 |
| 135 | 7.70 | 0.62 |
| 150 | 7.63 | 0.55 |
| 165 | 7.60 | 0.52 |
| 180 | 7.59 | 0.51 |
| 195 | 7.58 | 0.50 |
| 210 | 7.51 | 0.43 |
| 225 | 7.51 | 0.43 |
| 240 | 7.52 | 0.44 |
| 255 | 7.53 | 0.45 |
| 270 | 7.55 | 0.47 |
| 285 | 7.60 | 0.52 |
| 300 | 7.63 | 0.55 |
| 315 | 7.66 | 0.58 |
| 330 | 7.68 | 0.60 |
| 345 | 7.6 | 0.52 |
| 360 | 7.58 | 0.50 |
| 375 | 7.57 | 0.49 |

The data demonstrate the ability of the dry activated carbon composition of the present invention to maintain an outflow pH of ±1 pH units during and after the start-up phase of treating an aqueous system with an activated carbon bed containing the present activated carbon composition.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. In a process for purifying water comprising passing an aqueous system containing impurities through a bed of activated carbon composition, adsorbing the impurities onto the activated carbon composition and producing purified water, the improvement comprising:
passing the aqueous system through a bed of an activated carbon composition consisting essentially of activated carbon and a carboxylic acid containing compound, and optionally water, for at least a start-up phase; and
producing purified water having a pH that differs by less than one unit from the pH of the aqueous system containing impurities at least during the start-up phase.

2. A process as in claim 1, wherein the start-up phase comprises an initial at least 2500 volumes of the bed.

3. A process as in claim 1, wherein the carboxylic acid containing compound is present in the activated carbon composition in an amount of from 0.01 to 5 percent by weight based on the dry weight of activated carbon.

4. A process as in claim 1, wherein the activated carbon is derived from one or more selected from the group consisting of bituminous coal, anthracite, lignite, wood, peat, coconut shells and synthetic polymers.

5. A process as in claim 1, wherein the carboxylic acid containing compound is selected from hydroxy carboxylic acids and their corresponding salts.

6. A process as in claim 5, wherein the hydroxy carboxylic acids and their corresponding salts are one or more selected from the group consisting of citric acid, ascorbic acid, erythorbic acid, glycolic acid, lactic acid, salicylic acid, hydroxybutyric acid, hydroxyvaleric acid and their corresponding ammonium, sodium and potassium salts.

7. A process as in claim 1, wherein the carboxylic acid containing compound is one or more carboxylic acid containing compounds selected from the group consisting of sequestering agents, buffers, base neutralizers, antioxidants and reducing agents.

8. A process as in claim 1, further comprising a step of preparing the activated carbon composition by soaking the activated carbon in a solution containing the carboxylic acid containing compound.

9. A process as in claim 1, wherein the carboxylic acid containing compound occupies the high energy adsorption sites of the activated carbon.

10. A process as in claim 1, wherein the activated carbon composition is dry at start-up of the water purification process.

11. A method of controlling the pH of water purified by contact with activated carbon during a start-up phase of a water treatment process comprising the steps of:
a) providing a bed of an activated carbon composition consisting essentially of activated carbon and a carboxylic acid containing compound, and optionally water;
b) starting a flow of an aqueous system containing impurities into the bed of activated carbon composition and a flow of purified water out of the bed; and
c) maintaining a difference in pH between the aqueous system entering the bed and the purified water exiting the bed at less than 1 pH unit at least during a start-up phase.

12. A method as in claim 11, wherein the start-up phase comprises passage of at least 2500 bed volumes of the aqueous system through the bed.

13. A method as in claim 11, wherein the carboxylic acid containing compound is present in the activated carbon composition in an amount of from 0.01 to 5 percent by weight based on the dry weight of activated carbon.

14. A method as in claim 11, wherein the activated carbon is derived from one or more selected from the group consisting of bituminous coal, anthracite, lignite, wood, peat, coconut shells and synthetic polymers.

15. A method as in claim 11, wherein the carboxylic acid containing compound is selected from hydroxy carboxylic acids and their corresponding salts.

16. A method as in claim 15, wherein the hydroxy carboxylic acids and their corresponding salts are one or more selected from the group consisting of citric acid, ascorbic acid, erythorbic acid, glycolic acid, lactic acid, salicylic acid, hydroxybutyric acid, hydroxyvaleric acid and their corresponding ammonium, sodium and potassium salts.

17. A method as in claim 11, wherein the carboxylic acid containing compound is one or more carboxylic acid containing compounds selected from the group consisting of sequestering agents, buffers, base neutralizers, antioxidant, and reducing agents.

18. A method as in claim 11, further comprising a step of preparing the activated carbon composition by soaking the activated carbon in a solution containing the carboxylic acid containing compound.

19. A method as in claim 11, wherein the carboxylic acid containing compound occupies the high energy adsorption sites of the activated carbon.

20. A method as in claim 11, wherein the activated carbon composition is dry at start-up of the water treatment process.

* * * * *